(12) United States Patent
Carraro et al.

(10) Patent No.: US 6,256,044 B1
(45) Date of Patent: Jul. 3, 2001

(54) DISPLAY TECHNIQUES FOR THREE-DIMENSIONAL VIRTUAL REALITY

(75) Inventors: Gianpaolo U. Carraro, Red Bank, NJ (US); John T. Edmark, New York, NY (US); James Robert Ensor, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/098,218

(22) Filed: Jun. 16, 1998

(51) Int. Cl.[7] ................................................. G06T 11/00
(52) U.S. Cl. ........................ 345/433; 345/438; 345/439; 345/473
(58) Field of Search ................................. 345/419, 433, 345/428, 435, 438, 439, 113, 127, 131, 473

(56) References Cited

U.S. PATENT DOCUMENTS 5,261,041 * 11/1993 Susman ................................ 345/473

OTHER PUBLICATIONS

U.S. application No. 08/938,304, Alfred Vaino Aho, filed Sep. 26, 1997.
U.S. application No. 60/055,384, Alfred Vaino Aho, filed Aug. 4, 1997.
U.S. application No. 08/869,056, Gianpaolo U. Carraro, filed Jun. 4, 1997.
U.S. application No. 08/906,214, Gianpaolo U. Carraro, filed Aug. 4, 1997.
U.S. application No. 08/906,215, Gianpaolo U. Carraro, filed Aug. 4, 1997.
U.S. application No. 09/107,566, Gianpaolo U. Carraro, filed Jun. 29, 1998.
U.S. application No. 08/405,062, Sudhir Raman Ahuja, filed Mar. 16, 1995.
U.S. application No. 08/052,492, Sudhir Raman Ahuja, filed Apr. 22, 1993.
U.S. application No. 08/906,216, James Robert Ensor, filed Aug. 4, 1997.
U.S. application No. 09/107,059, John T. Edmark, filed Jun. 30, 1998.
U.S. application No. 09/108,029, John T. Edmark, filed Jun. 30, 1998.

* cited by examiner

Primary Examiner—Mark Zimmerman
Assistant Examiner—Philip Stevenson
(74) Attorney, Agent, or Firm—Eugene J. Rosenthal

(57) ABSTRACT

A limitation of a three-dimensional world in which objects in the distance may be represented in only two dimensions as a video on a screen occurs when a computer graphic object represented by computer graphics, e.g., in front of, to the side, above, or below the video screen, undergoes a trajectory that takes it to a location in the world that is not represented as computer graphics, but instead is within the field represented by the video, because such an object would disappear from view by the viewer. This limitation is overcome by having by determining when a computer graphic object undergoes a trajectory that takes it to a location in the world that is not represented as computer graphics, but instead is within the field represented by the video, and representing such an object as computer graphics in front of the screen to which at least one perspective transformation is applied, the perspective transformation being at least a function of the position at which the object is actually located.

24 Claims, 4 Drawing Sheets

(2 of 4 Drawing Sheet(s) Filed in Color)

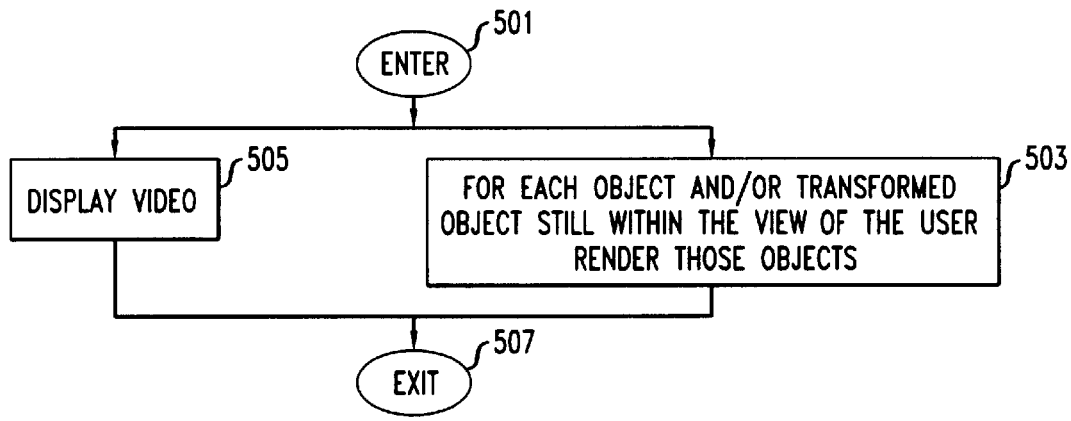
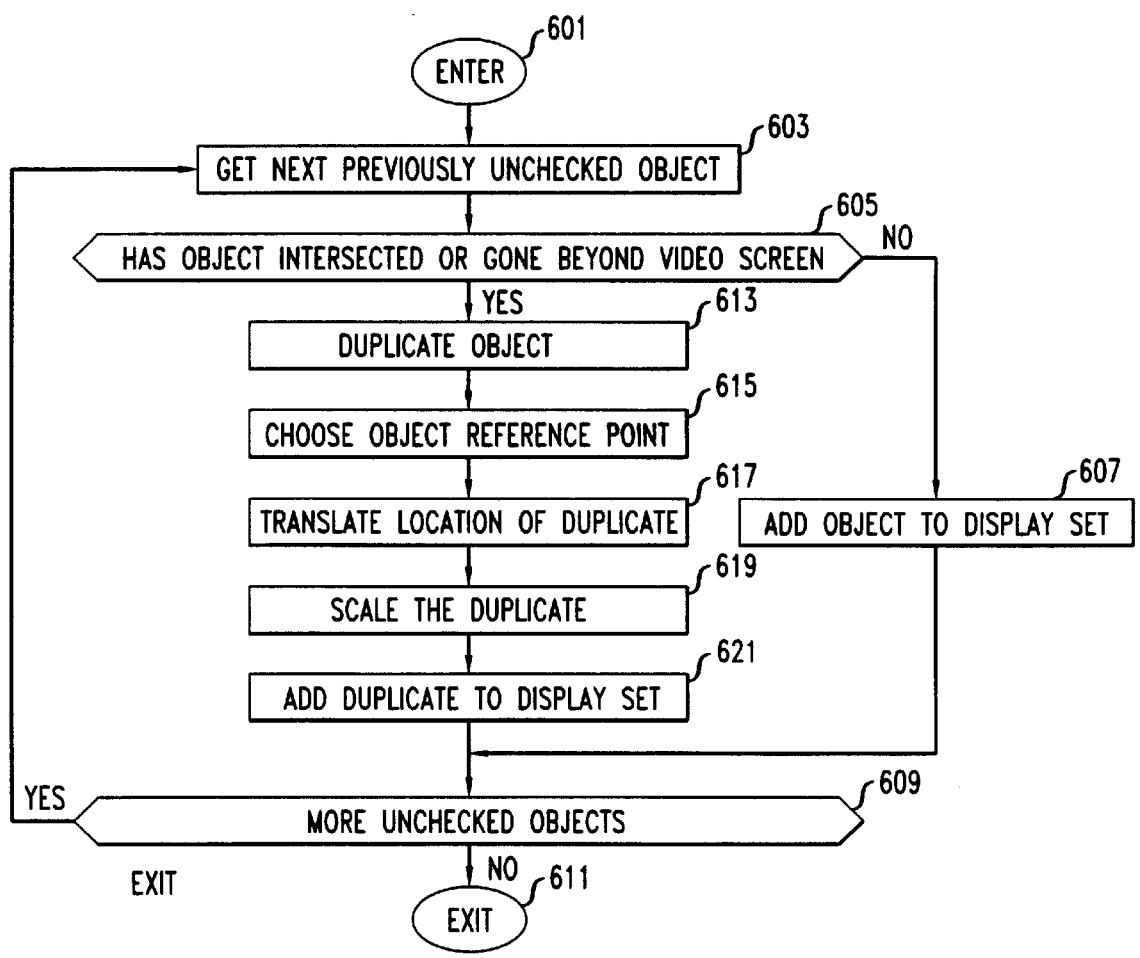

DISPLAY TECHNIQUES FOR THREE-DIMENSIONAL VIRTUAL REALITY

TECHNICAL FIELD

This invention relates to the integration of computer graphics and video to provide a realistic three dimensional virtual reality experience.

BACKGROUND OF THE INVENTION

The display of a three dimensional world to a viewer requires considerable computation power, and it is typically costly to develop the necessary highly detailed models required for doing so. In order to simplify the problem, a portion of the world that is in the distance may be represented as a video displayed on a surface, e.g., a screen. By video it is meant the common usage of the term, such as the placing or projecting of predefined images on the surface, e.g., the electronic version of filmed moving pictures. Thus, such a world is essentially truncated in length to the screen on which the video is displayed. A great reduction in computation power and cost can be achieved by such an arrangement.

A limitation of such a world occurs when an object represented by computer graphics undergoes a trajectory that takes it to a location in the world that is not represented as computer graphics but instead is within the field represented by the video. If the object is generated at its proper location using computer graphic techniques, without further processing such an object becomes invisible to a viewer in front of the video screen, because the object is blocked from a viewer's view by the video screen. In U.S. patent application Ser. No. 08/906215 it was recognized that, when a computer graphic object undergoes a trajectory that takes it to a location in the world that is not represented as computer graphics, but instead is within the field represented by the video, that such an object should be represented as video on the screen, rather than computer graphics. Doing so prevents the object from becoming invisible as it would if it was generated at its proper location using computer graphic techniques, since it would be blocked from view by the video screen. Thus, the computer graphics object "goes into the video" as video and remains visible to a viewer in front of the video screen.

SUMMARY OF THE INVENTION

We have recognized that when a computer graphic object is located at, or undergoes a trajectory that takes it to, a location in the world that is not represented as computer graphics, but instead is within a field represented by video, one may wish to maintain the object as computer graphics, yet still have the object be visible to a viewer and appear as if the object was at its proper location within the video. This can be achieved, in accordance with the principles of the invention, by a) determining when a computer graphic object is located at, or undergoes a trajectory that takes it to, a location in the world that is not represented as computer graphics, but instead is within the field represented by the video, and b) representing such an object as a computer graphic which is in front of the screen and to which at least one transformation, e.g., a perspective transformation, is applied. The perspective transformation may be at least a function of the distance beyond the video screen at which the object would actually be located if it were to be drawn using the same representation employed prior to its crossing the video screen. In other words, instead of the computer graphics object "going into the video" as video, the object as computer graphics is made to appear as if it went into the video by using perspective techniques. Thus, the object remains visible to a viewer in front of the video screen rather than becoming invisible because it is blocked from view by the video screen as would have occurred had the object been generated at its proper location.

BRIEF DESCRIPTION OF THE DRAWING

The file of this patent contains at least one drawing executed in color. Copies of this patent with color drawing(s) will be provided by the Patent and Trademark Office upon request and payment of the necessary fee.

FIG. 5 shows an exemplary process for displaying the world to a user, in accordance with the principles of the invention;

FIG. 6 shows an exemplary process, in accordance with the principles of the invention, for determining the set of objects and/or transformed objects that are included in the set of objects displayed in by the process of FIG. 5 in the computer graphics part of the world.

DETAILED DESCRIPTION

FIGS. 1–4 show an example, in accordance with the principles of the invention, of a computer graphics object that is made to appear using perspective techniques as if it went into the video as computer graphics, and the computer graphics object remains visible to a viewer in front of the video screen rather than becoming invisible because it was generated at its proper location, and so was blocked from view by the video screen. More specifically, FIGS. 1–4 show what happens when a computer graphic object is at a location in the world that is not represented as computer graphics, but instead is within the field represented by the video, and such an object is represented according to the invention in front of the screen as computer graphics to which at least one perspective transformation is applied. The perspective transformation shown is at least a function of the distance between the viewer and the location at which the object would actually be located if it were to be drawn using the same representation employed prior to its crossing the video screen.

Figure 1:
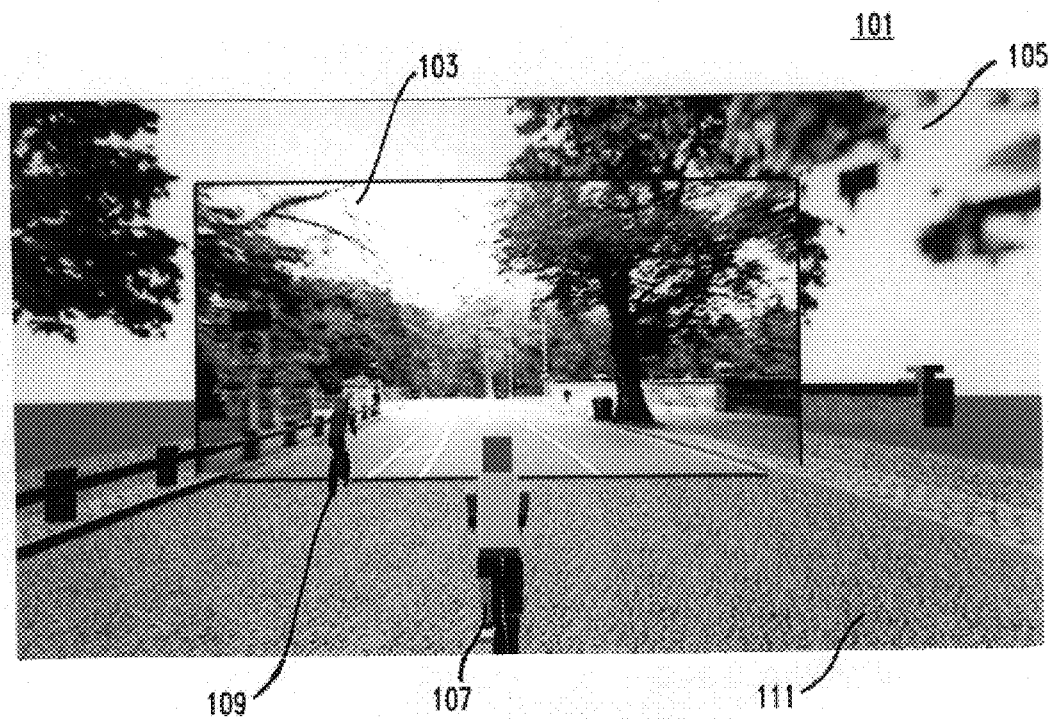
FIGS. 1–4 show an example, in accordance with the principles of the invention, of a computer graphics object that is made to appear using perspective techniques as if it went into the video as computer graphics.
Figure 2:
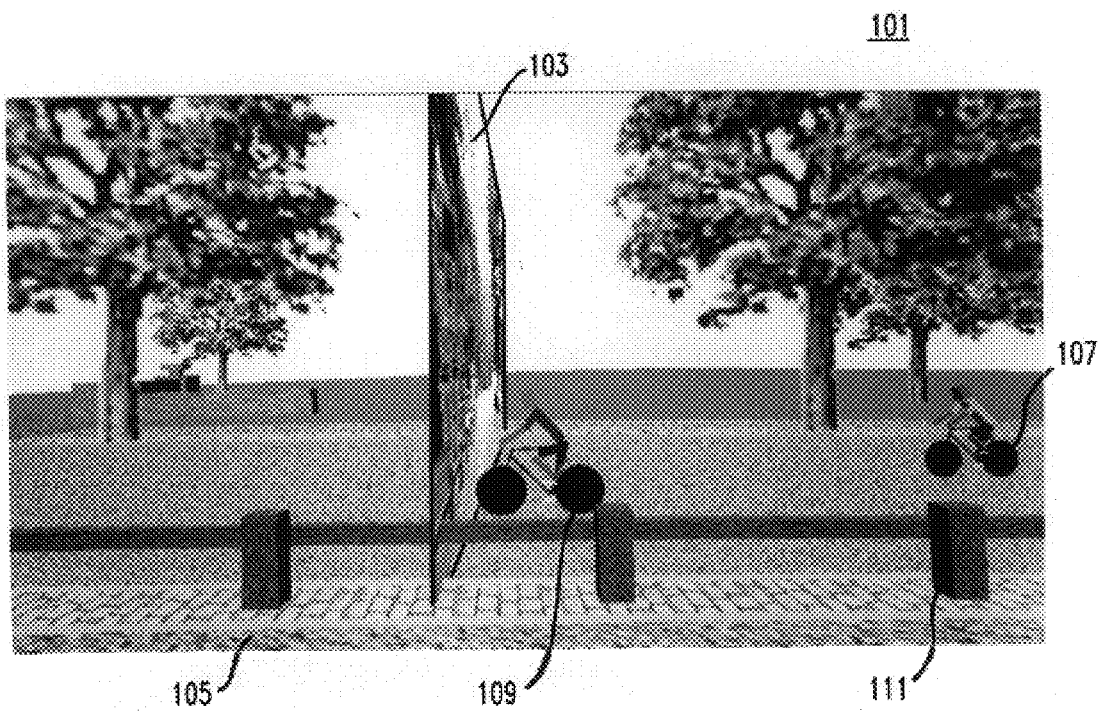

FIG. 1 shows world 101, which is a bicycle path in a park, e.g., Central Park in New York City. World 101 is divided into two portions, video screen 103, on which is shown the current frame of a video and the remainder of the world 105, which is represented using computer graphics techniques, and is thus referred to herein as computer graphics part (CG Part) 105. Within CG Part 105 there are various elements, such as bicyclist 107 representing the user, another bicyclist 109, and road 111. In FIG. 1 bicyclists 107 and 109 are shown using their untransformed, or base, appearance. For clarity purposes, the border of video screen 103 is highlighted. However, as portions of video screen 103 are occluded by other objects, such as portions of the bodies of bicyclists 107 and 109 as well as sides of road 111, the border section of such occluded portions cannot be seen, and so there is no highlighting in that area.

Figure 3:
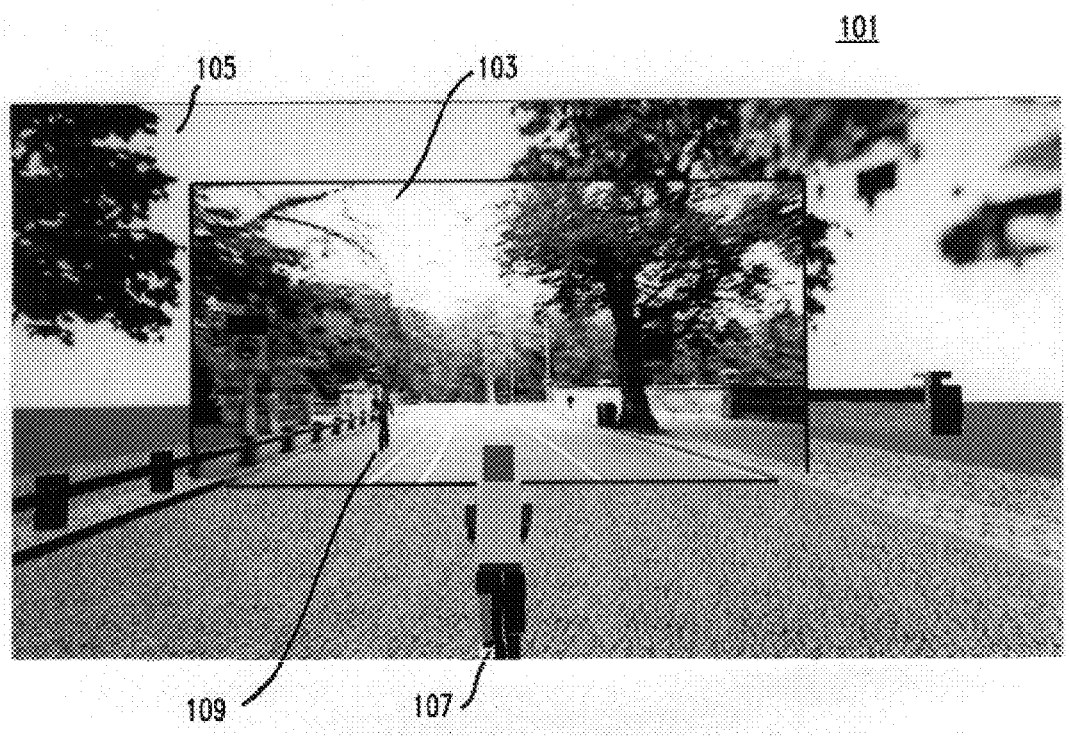

Note that the viewpoint of the user is actually behind the representation of both bicyclists 107 and 109. Also note that bicyclist 107 is moving slower than bicyclist 109. If this continues, eventually, bicyclist 109 will reach screen 103 while bicyclist 107 lags behind. This occurs in FIG. 2, which shows world 101 of FIG. 1, but at a later time and from a side perspective. If the relative motion difference continues between bicyclists 107 and 109, part, and then all, of bicyclist 109 will intersect with, or go past, video screen 103. If this happens, part, and then all, of bicyclist 109 will become occluded by video screen 103 from the view of a user in front of video screen 103, and so bicyclist 109 will no longer be visible to such a user. Therefore, in accordance with the principles of the invention, the appearance of bicyclist 109 is transformed into transformed bicyclist 309, e.g., using perspective techniques, so that it gives the illusion that bicyclist 309 appears to be within the video that is displayed on video screen 103 rather than being represented using the same appearance as is used for bicyclist 109 within CG Part 105, as shown in FIG. 3. Note that by perspective techniques it is meant techniques that apply at least one of scaling, translation, and orientation manipulation to the bicyclist. Also note that transformed bicyclist 309 is referred to as a so-called "trace" of bicyclist 109.

The determination to represent an object, such as bicyclist 109, using a transformed appearance may be made when the object is within a selected distance from one or more points on the video screen rather than requiring the change in representation to be at the exact point when the object intersects the video screen. This is especially useful since the video screen may be any surface and need not be simply a planar surface. Furthermore, the distance employed may be determined dynamically, e.g., as a function of the speed and trajectory of the bicyclist. The change in appearance may also take place only once it is determined that a predetermined portion of the object has actually intersected, or passed through, the video screen.

In other implementations of the invention, the computer untransformed representation of bicyclist 109 may remain visible from other viewpoints, such as a side view. Thus, in accordance with an aspect of the invention, the determination as to whether or not to transform an object that is being represented using computer graphic techniques rather than continuing to be represented untransformed may be additionally a function of the viewpoint of the user.

Figure 4:
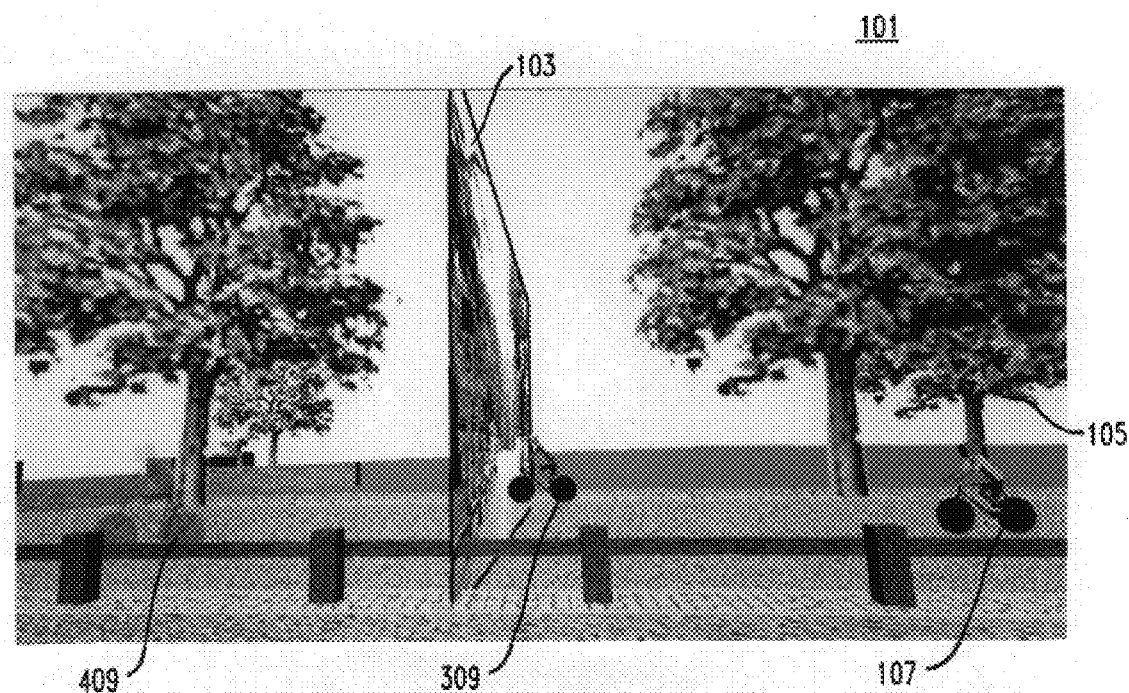

A corresponding side view of the world as it appears in FIG. 3 is shown in FIG. 4. Also shown in FIG. 4 is "ghost" bicyclist 409, which represents the actual location and appearance of bicyclist 109 from which transformed bicyclist 309 is generated. Although not done so for FIG. 4, which is merely for pedagogical purposes, preferably, but not necessarily, both transformed bicyclist 309 and the untransformed bicyclist 409 should not visible to a viewer at the same time.

In the event that bicyclist 107 speeds up or bicyclist 109 slows down, so that based on the relative motion between them bicyclist 109 would no longer be at or beyond video screen 103, bicyclist 109 may again be rendered using the untransformed appearance, as shown in FIG. 1.

As described in connection with FIGS. 1–4, the transformed representation, e.g., bicyclist 301, is displayed immediately adjacent to video screen 103. However, doing so is not necessary. Instead, the transformed representation may be placed anywhere between video screen 103 and the viewer's viewpoint—provided the transformation is properly conformed to the location of the transformed object. However, an advantage of placing the transformed representation adjacent to video screen 103 is that by doing so any items that are between video screen 103 and the view's viewpoint that should occlude a portion of the transformed object will do so. Otherwise, if the transformed object is placed closer to the user's viewpoint, although the object will look correct to a viewer, objects between the location of the transformed object and the screen will not occlude the transformed object as they would if the untransformed object could be rendered and remain visible at its actual expected location.

FIG. 5 shows an exemplary process for displaying the world to a user, in accordance with the principles of the invention. The process is entered in step 501 whenever the world view of the user needs to be updated. It may be necessary to update the world view of the user a) whenever a new frame of video must be displayed; b) when an object within computer graphics part of the world, e.g., CG Part 105, has moved; c) when the user's viewpoint is changed; or d) for any combination of the foregoing reasons. Thereafter, steps 503 and 505 are performed, and these steps may be performed in parallel. In step 503, each object, or a transformed version of the object if the object has gone past the video screen, that is part of the set of objects that is within the currently displayed portion of the computer graphics portion of the world is rendered within the computer graphics part of the world. In step 505 a frame of video is displayed on video screen. This may be either a new frame of video, if it is time to update the video frame being displayed, or it may be the same frame of video that was previously displayed, if the world view of the user is being updated because of a need to change the representation of the computer graphics part of the world. The process then exits in step 507.

FIG. 6 shows an exemplary process, in accordance with the principles of the invention, for determining the set of objects and/or transformed objects from which are selected the objects and/or transformed objects displayed in step 503 of FIG. 5. The process is entered in step 601 whenever set of objects and/or transformed objects for display in the computer graphics part of the world must be updated. Thus, execution of the process of FIG. 6 may be linked to execution of step 503 of FIG. 5 or it may be independent thereof. Next, in step 603, the next previously unchecked object is obtained, so that the process may check if it needs to be transformed and to do so if necessary. Thereafter, conditional branch point 605 tests to determine if the object has intersected, or gone beyond, video screen 103. This determination may be made for the object on the basis of a designated point on the object, which may be prespecified, e.g., as part of the model of the object.

If the test result in step 605 is NO, control passes to step 607 in which the object is added to a so-called "display set" for use in step 503. Control next passes to conditional branch point 609, which tests to determine if there remains more unchecked objects. If the test result in step 609 is YES, control passes back to step 603 to check the next object. If the test result in step 609 is NO, control passes to step 611 and the process is exited.

If the test result in step 605 is YES, indicating that the object has passed beyond the video screen and will otherwise become occluded from the viewer's view, a process is undertaken in steps 613 through 621 to develop the transformed representation of the object, in accordance with the principles of the invention. More specifically, in step 613, a duplicate of the object is developed, and in step 615 a reference point for the object is selected. The point chosen is at the discretion of the implementer. It may correspond to the predesignated point of object that was employed in step 605. Typically, the point chosen will—although it is not required to—be within the bounding box of the object. The remaining steps are more easily understood in connection with the example shown in FIG. 7.

Figure 7:
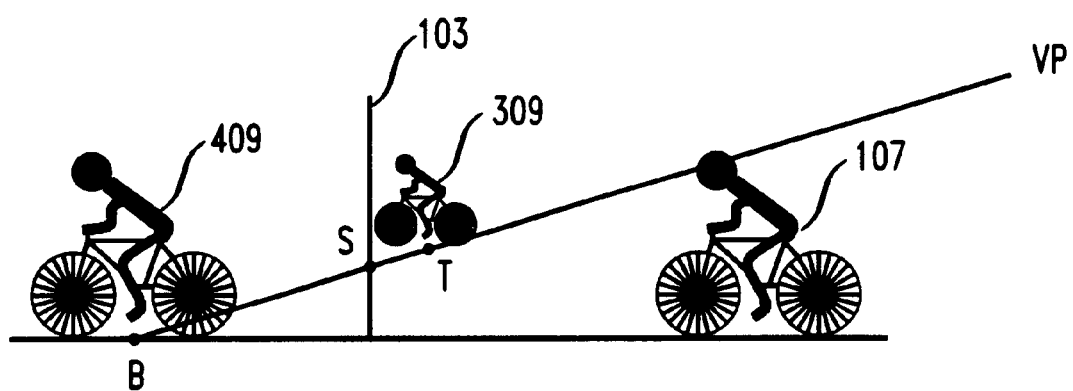
FIG. 7 shows a simplified representation of FIG. 4

FIG. 7 shows a simplified representation of FIG. 4, including a) video screen 103, b) bicyclist 107, c) transformed bicyclist 309, and d) original bicyclist 409 for which transformed bicyclist 309 is developed. Also shown is a line extending from point VP, which is the location of the viewpoint of FIGS. 1 and 3, to point B, which is the reference point chosen in step 615 for bicyclist 409. Along the VB-B line is point S, which is the point at which the VB-B line intersects video screen 103. Point T, also along the VB-B line, corresponds to the point at which the duplicate is translated in step 617, in accordance with the principles of the invention. Specifically, point T corresponds to the reference point of the duplicate but it is located at a point, selected by the implementer, that lies between S and VP, preferably, but not necessarily, as close to S as possible, while insuring that that the duplicate will never intersect the video screen when it is rotated about any axis passing through point T, based on the size of the transformed object when it is located at point T. A conservative way to select point T is to use the full sized object to be transformed, e.g., bicyclist 409.

In step 619, the duplicate is scaled to match its translated location, so that it appears to a viewer at VP to be in proper perspective, in accordance with the principles of the invention. In an exemplary embodiment of the invention, the scaled size of the duplicate object is determined by using a scale factor which is the ratio of the distance from S to VP with respect to the distance from B to VP. The scale factor is then multiplied by the original size of the object, to determine the size of the transformed object.

Note that in this embodiment of the invention, there is no need to change the orientation of the transformed object from that of the original object, although both its location and it size are transformed.

The duplicate object as scaled and translated is added to the display set. The process then continues at step 609 as described above.

Using a duplicate of the original object gives a seamless appearance to the object as its actual position crosses between the computer graphics area and the video screen. However, a duplicate of the original object need not be employed. Instead, an alternate object may be used to represent the original object as, or as part, of the transformation.

The processes of the invention may be implemented by a system which includes a processor running software to execute the functionality of the processes described herein, and the resulting images displayed on a display, such as a computer monitor.

The foregoing merely illustrates the principles of the inventions. It will thus be appreciated that those skilled in the art will be able to devise various arrangements which, although not explicitly described or shown herein, embody the principles of the invention and are included within its spirit and scope.

What is claimed is:

1. A method for use in processing a view of a three dimensional world in which a first portion of said world is modeled as computer graphics and a second portion of said world is represented by a video, wherein said video is made up of a sequence of images displayed on a video screen which exists in said first portion of said world, said video displaying a plurality of objects, the method comprising the steps of:

determining that an object being modeled as computer graphics is at a location that is being represented by said video; and transforming the appearance of said object as computer graphics;

whereby said transformed appearance of said object remains visible to a viewer of said video even though said object remains as computer graphics.

2. The invention as defined in claim 1 wherein said transformed appearance of said object appears to be within said video.

3. The invention as defined in claim 1 wherein said transforming of appearance gives the appearance that said object has moved to said location.

4. The invention as defined in claim 1 wherein said transforming of appearance is a function of at least one of the set of: a speed of said object, a trajectory of said object, an orientation of said object, a location of said object, and a viewpoint of a viewer of said three dimensional world.

5. The invention as defined in claim 1 wherein said transforming of appearance includes the step of translating said location of said object to be between a viewer of said world and a screen on which said video is displayed.

6. The invention as defined in claim 1 wherein said transforming of appearance includes the step of changing at least one of the scale, location, orientation, and shape of said object.

7. The invention as defined in claim 1 wherein said transforming of appearance includes the steps of:

selecting a point on said object;

selecting a location for said object between a viewpoint of a viewer and a video screen displaying said video such that if said selected point of object were located at said location said object would not intersect with said video screen regardless of an axis through said point at said location that said object was rotated around;

scaling said object by a factor equal to the ratio of a) the distance between said screen and said viewpoint to b) the distance between said selected point on said object if said object were to be displayed at its actual determined location and said viewpoint.

8. A method for use in processing a view of a three dimensional world in which a first portion of said world is modeled as computer graphics and a second portion of said world is represented by a video, wherein said video is made up of a sequence of images displayed on a video surface which exists in said first portion of said world, said video displaying a plurality of objects, the method comprising the step of:

changing the appearance of an object that had been modeled as computer graphics as a function of a distance between said object and a viewpoint of a viewer of said three dimensional world, said object remaining modeled as computer graphics.

9. The invention as defined in claim 8 wherein said changing of appearance in said changing step is a further function of at least one of the set of: a speed of said object, a trajectory of said object, and a distance between said object and said video surface.

10. A method for use in processing a view of a world in which a first portion of said world is modeled as computer graphics and a second portion of said world is represented by a video, wherein said video is made up of a sequence of images displayed on a video surface which exists in said first portion of said world, said video displaying a plurality of objects, the method comprising the step of:

changing the appearance of an object modeled as computer graphics when said object undergoes a trajectory that takes at least a portion of said object to a location in the world that is not represented as computer graphics but instead is within the field represented on said video surface, said object with its changed appearance still being modeled as computer graphics.

11. The invention as defined in 10 wherein said changing step is a function of a viewpoint of a viewer.

12. The invention as defined in 10 wherein said changing step is a function a speed of said object.

13. A method for use in processing a view of a world in which a first portion of said world is modeled as computer graphics and a second portion of said world is represented by a video, wherein said video is made up of a sequence of images displayed on a video surface which exists in said first portion of said world, said video displaying a plurality of objects, comprising the steps of:

displaying an object as having a first appearance when said object is determined to be at a location in the world that is represented as computer graphics; and displaying said object as having a second appearance when a portion of said object is determined to appear to be at a location in the world that is not represented as computer graphics but instead is within the field represented on the video surface;

said object being modeled as computer graphics when displayed with said first appearance and second appearance.

14. The invention as defined in claim 13 wherein said second appearance of said object is displayed in front of said video surface.

15. The invention as defined in claim 13 further including the step of changing the appearance of said object from said first appearance to said second appearance when a portion of said object transits from a location in the world that is represented as computer graphics to a location within the field represented on the video surface.

16. The invention as defined in claim 13 wherein said second appearance is a function of said first appearance and a location of said object with respect to said video surface.

17. A system for displaying an apparently three dimensional world to a user, in which a first part of said three dimensional world is displayed as computer graphics and a second part is displayed as video on a video screen, wherein said video is made up of a sequence of images displayed on a video screen which exists in said first portion of said world, said video displaying a plurality of objects, said system comprising:

a processor for determining that an element displayed in said first part of said world transited from said first part to said second part; and a rendering engine for displaying said world with said element displayed still in said first part modeled as computer graphics yet appearing to be in said second part rather than said first part.

18. A system for displaying an apparently three dimensional world to a user, in which a first part of said three dimensional world is displayed as computer graphics and a second part is displayed as video on a video screen, wherein said video is made up of a sequence of images displayed on a video screen which exists in said first portion of said world, said video displaying a plurality of objects, said system comprising:

a processor for determining that a portion of an object initially in said first part of said world has moved to a location within said second part of said; and a rendering engine for displaying said world with said element displayed so that it appears to be in said second part rather than said first part even though said element is actually in said first part and still modeled as computer graphics.

19. The invention as defined in claim 18 wherein said rendering engine displays said world with said element appearing to be in said second part rather than said first part when said processor determines that a portion of said object initially in said first part of said world has moved to a location immediately adjacent to said video screen.

20. Apparatus for use in processing a view of a three dimensional world in which a first portion of said world is modeled as computer graphics and a second portion of said world is represented by a video, wherein said video is made up of a sequence of images displayed on a video screen which exists in said first portion of said world, said video displaying a plurality of objects, the apparatus comprising:

means for determining that an object being modeled as computer graphics has moved to a location that is being represented by said video; and means for transforming the appearance of said object as computer graphics so that it appears to be within that part of the world modeled by said video, although actually it is not.

21. Apparatus for use in processing a view of a world in which a first portion of said world is modeled as computer graphics and a second portion of said world is represented by a video, wherein said video is made up of a sequence of images displayed on a video surface which exists in said first portion of said world, said video displaying a plurality of objects, the apparatus comprising:

means for displaying an object as having a first appearance when said object is determined to be at a location in the world that is represented as computer graphics; and means for displaying said object as having a second appearance when a portion of said object is determined to appear to be at a location in the world that is not represented as computer graphics but instead is within the field represented on the video surface;

said object being modeled as computer graphics when displayed with said first appearance and second appearance.

22. The invention as defined in claim 21 wherein both of said means for displaying are comprised within a single system.

23. The invention as defined in claim 21 wherein both of said means for displaying are implemented using a single processor running different software for each means.

24. A method for use in processing a view of a three dimensional world in which a first portion of said world is modeled as computer graphics and a second portion of said world is represented by a video, wherein said video is made up of a sequence of images displayed on a video surface which exists in said first portion of said world, said video displaying a plurality of objects, the method comprising the step of:

means for changing the appearance of an object that had been modeled as computer graphics as a function of a distance between said object and said video surface, said object continuing to be modeled as computer graphics; and means for supplying said changed representation to a display for displaying said changed representation to a user.

* * * * *